July 25, 1933.   M. HOFMANN   1,919,654
COUPLING
Original Filed Dec. 11, 1929
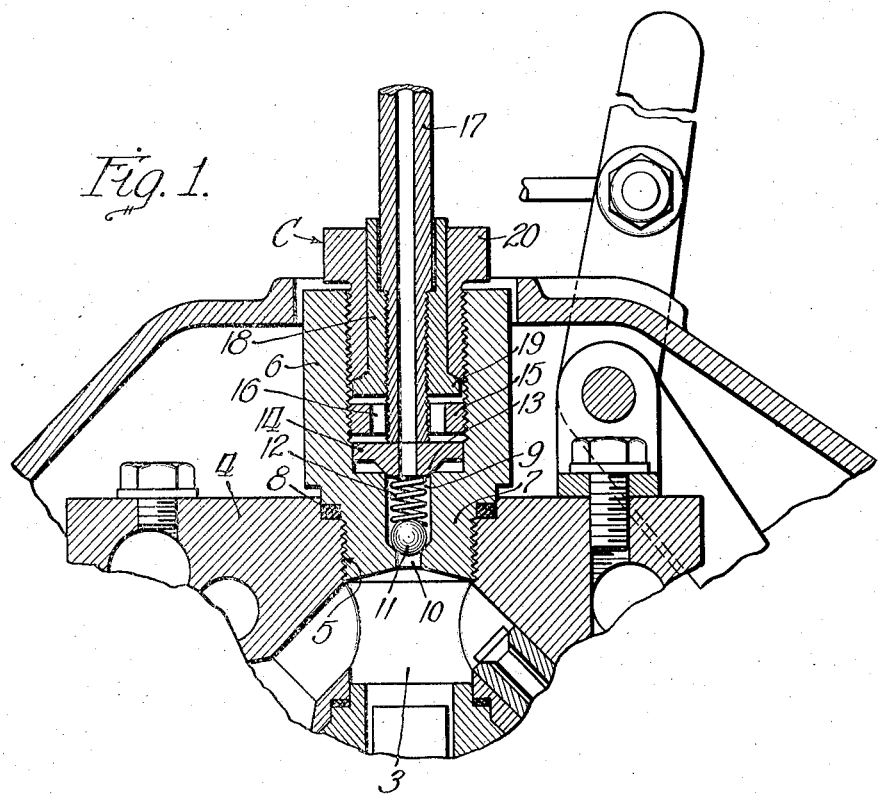
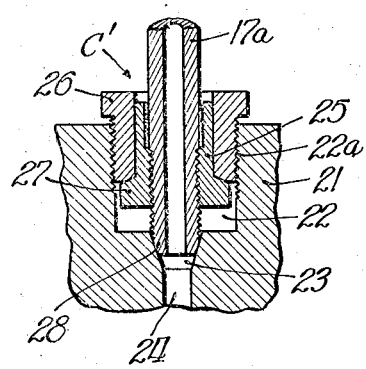
Inventor:
Max Hofmann
By: Brown, Jackson, Boettcher & Dienner.
Attys.

Patented July 25, 1933

1,919,654

UNITED STATES PATENT OFFICE

MAX HOFMANN, OF WAUKESHA, WISCONSIN, ASSIGNOR TO WAUKESHA MOTOR COMPANY, OF WAUKESHA, WISCONSIN, A CORPORATION OF WISCONSIN

COUPLING

Original application filed December 11, 1929, Serial No. 413,196. Divided and this application filed April 3, 1931. Serial No. 527,593.

This invention relates to an improvement in couplings, and is more particularly directed to a type of coupling which is specially adapted for connecting a fluid conducting tube to a fuel pump, injection nozzle, or like device.

The coupling comprising the present invention may be used for conducting liquid to or from any type of apparatus, but is of particular value in devices wherein liquid is delivered under pressure. The preferred form of coupling herein illustrated and described, is shown as connecting a fuel tube to the pump chamber of a fuel pump of similar construction to the pump disclosed in my copending application Serial No. 413,196, filed December 11, 1929, for fuel pump, of which the present application is a division.

One of the main objects of this invention is to provide means for suitably coupling a tube with any form of apparatus such as a pump, injection nozzle, etc., in such a manner as to avoid necessity of varying the interior diameter of the tube. In maintaining a continuous unvarying interior diameter in a tube, a more uniform flow of liquid through the tube is assured.

Another object of the present invention is to provide a coupling of comparatively simple and inexpensive construction.

A still further object is to provide a coupling which can be adapted with facility to serve in its desired capacity to conveniently and quickly connect a tube with a device utilizing the same, and which will allow removal of the tube with equal ease and expediency.

Further objects and advantages of my invention will hereinafter appear from the following detailed description, reference being had to the accompanying drawing.

In the drawing:

Figure 1 is a longitudinal cross sectional view through a coupling comprising the present invention, illustrating the same as connecting a tube with the pump chamber of a fuel pump, the pump being shown fragmentarily and in section; and Figure 2 is a longitudinal cross sectional view of a modified form of coupling.

Referring now to Figure 1, the coupling C is here utilized for connecting a delivery tube with a pump for communication with the pump chamber 3. In this particular pump construction the pump block 4 is bored and interiorly threaded at 5 for the reception of a sleeve 6. Sleeve 6, provided at its lower end with a reduced threaded neck 7, screws into the upper end of the opening or bore above chamber 3, and a gasket 8 is interposed between this sleeve and a shoulder formed in the block about the opening to effect a fluid tight and pressure resistant closure between the sleeve and the block. Sleeve 6 is interiorly threaded from its upper end to within a short distance of its lower end, and neck 7 is provided with a reduced bore 9 leading from the bore of the sleeve, and with an outlet port 10 opening from bore 9 into pump chamber 3. The lower end of bore 9 is tapered toward port 10 to provide a seat for a ball check valve 11 normally held seated by a spring 12 confined between the ball check valve and the downwardly tapering boss 13 of a ring 14 which fits within the lower unthreaded portion of the bore of sleeve 6. The opening of this ring is in alignment with bore 9 and the underface of boss 13 is rounded so as to seat accurately in the upper end of bore 9, which is slightly flared at its upper end for this purpose. A pressure ring 15, provided with slots 16 for reception of elements of a suitable tool, screws into sleeve 6 and serves to secure ring 14 accurately in position when tubing 17 is being assembled or disassembled. Ring 15 is provided with a central bore of proper size to snugly receive and guide the lower end of the fuel delivery tube 17 for conducting the fuel under pressure, from the pump to any suitable point of delivery such as an injection nozzle of an injection engine. The ring 14 projects inwardly beyond the bore of ring 15, radially thereof, so as to extend beneath the lower end of tube 17 which seats thereon.

A thimble 18 is threaded and brazed, or otherwise suitably secured upon tube 17 and is provided, at its lower end, with an outer shoulder 19 slidable within sleeve 6. The upper face of this shoulder is inclined downwardly and outwardly of the sleeve and a clamp nut 20 fits about thimble 18 and screws into the sleeve 6, the surface at the lower end of this nut being inclined downwardly and outwardly of the sleeve for contact with the inclined shoulder of the thimble. By turning the nut into the sleeve, tube 17 is forced downwardly so as to seat tightly upon the upper face of ring 14 and form a fluid tight closure therewith. The thimble and the clamp nut serve to tightly secure the tube in position and also to resist pressure to which the tube is subjected and which might tend to move the tube away from ring 14. This provides simple and highly efficient means for securing a tube such as 17 to a pump at the discharge side thereof while avoiding any change in the interior diameter of the tube, which would be apt to affect the flow of fluid such as fuel oil therethrough and, therefore, would tend to interfere with the accuracy of the feed of fuel to the source of use, as to an injection nozzle of an engine.

Figure 2 illustrates a modified form of coupling C'. In this construction member 21, forming a portion of a device to which tube 17 is connected, is suitably bored out at 22 and threaded as at 22a to receive the coupling. A centrally disposed tapered bore 23 connects the coupling receiving bore with a communicating passage 24. The coupling C' is constructed similarly to the preferred form of coupling illustrated in Figure 1 and comprises a thimble 25 threaded and brazed, or otherwise suitably secured upon tube 17a, and a clamp nut 26. Thimble 25 is provided at its lower end with an outwardly extending peripheral shoulder 27 slidable within bore 22, the upper face of this shoulder being inclined downwardly and outwardly to receive the lower end of nut 26, the latter being provided with a complementary cooperating surface for snugly engaging shoulder 27. In this construction, tube 17a projects beyond the bottom face of thimble 25, and is provided with a tapered end 28. The inclination of the tapered end 28 of tube 17a is such that it conforms to the tapered wall of opening 23. When clamp nut 26 is screwed into bore 22, the tapered end 28 of tube 17a is forced tightly into the tapered opening 23 to form a fluid tight closure between member 21 and tube 17a.

In both forms of couplings illustrated in Figures 1 and 2, there is a double seal or closure created between the tube and the device to which the tube is connected. In Figure 1, the end of tube 17 firmly abuts ring 14 through the action of clamp nut 20 upon the shoulder of the thimble 18, thereby forming a fluid tight seal or closure between tube 17 and ring 14. Likewise, the beveled surfaces of the thimble shoulder 19 and the clamp nut 20 are also firmly pressed together when the nut is turned tight to form a second fluid tight seal or closure externally of the tube and between the tube and sleeve. With the modified form of construction, the same result is obtained. In the latter, one fluid tight seal or closure is effected between the tapered end of tube 17a and the tapered wall of opening 23, while a second fluid tight seal or closure is effected between the complementary coacting surfaces formed on the bottom face of nut 26 and upper face of shoulder 27, respectively.

While my invention is particularly adapted for use with injection nozzles and fuel pumps of injection engines, it is also well suited for many other purposes. I do not, therefore, limit my invention to any one particular use.

My invention is not to be strictly limited to the constructions disclosed except so far as it may be so limited by the appended claims.

What I claim is:

1. In combination in a coupling, a sleeve provided through its inner end with a reduced port, an inner ring loose in the sleeve and provided at its outer face with a rounded boss seating in the inner end of the port, the inner face of the ring being flat, an outer guide ring secured in the sleeve adjacent the inner ring, said inner ring having an opening therethrough communicating with the port and the guide ring having an opening therethrough concentric with the opening of the inner ring, a tube slidable through the guide ring and having its inner end seating flat against the inner face of the inner ring about the opening thereof, and means for securing the tube in the sleeve and for holding the inner end of the tube seated tightly against the outer face of the inner ring.

2. In combination in a coupling, a sleeve provided through its inner end with a reduced port having its outer end flared to form a seat, an inner ring loose in the sleeve and provided at its outer face with a rounded boss seating in the flared inner end of the port, the ring having an opening therethrough aligned with the port and the inner face of the ring being flat, an outer guide ring secured in the sleeve and having an opening concentric with the opening of the inner ring, a tube slidable through the guide ring and having its inner end seating flat against the inner face of the inner ring about the opening thereof, and means for securing the tube in the sleeve and for holding the inner end of the tube seated tightly against the outer face of the inner ring.

3. In combination in a coupling, a sleeve provided through its inner end with a reduced port having its outer end flared to form a seat, an inner ring loose in the sleeve and provided at its outer face with a tapered boss seating in the inner end of the port, the inner face of the ring being flat, an outer guide ring secured in the sleeve adjacent the inner ring, said inner ring having an opening therethrough communicating with the port and the guide ring having an opening therethrough concentric with the opening of the inner ring, a tube slidable through the guide ring and having its inner end seating flat against the inner face of the inner ring about the opening thereof, and means for securing the tube in the sleeve and for holding the inner end of the tube seated tightly against the outer face of the inner ring.

4. In combination in a coupling, an interiorly threaded sleeve provided through its inner end with a concentric reduced port, an inner ring loose in the sleeve and provided at its outer face with a rounded boss seating in the inner end of the port, the inner end of the port being shaped to provide a seat for the boss and said inner ring having a concentric opening therethrough, the inner face of the inner ring being flat, an outer guide ring screwed into the sleeve and having an opening concentric with the opening of the inner ring, a tube slidable through the guide ring and having its inner end seating flat against the inner face of the inner ring about the opening thereof, a member secured to the tube and providing an outwardly projecting shoulder therefor, and a clamp nut screwing into the sleeve and bearing against said shoulder.

MAX HOFMANN.